(12) United States Patent
Qumei

(10) Patent No.: US 8,046,753 B1
(45) Date of Patent: Oct. 25, 2011

(54) MOBILE HANDSET WITH SYMBIAN OS AND UPDATE AGENT

(75) Inventor: Iyad Qumei, Huntington Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1271 days.

(21) Appl. No.: 10/864,095

(22) Filed: Jun. 9, 2004

Related U.S. Application Data

(60) Provisional application No. 60/479,265, filed on Jun. 18, 2003.

(51) Int. Cl.
G06F 9/44 (2006.01)

(52) U.S. Cl. ........................................ 717/173

(58) Field of Classification Search .................. 717/168, 717/172, 173, 176, 174; 709/221, 227; 719/310; 713/1, 168; 726/15

See application file for complete search history.

(56) References Cited

U.S. PATENT DOCUMENTS

| | | | |
|---|---|---|---|
| 5,261,055 A | 11/1993 | Moran et al. .................. | 395/275 |
| 5,442,771 A | 8/1995 | Filepp et al. .................. | 395/650 |
| 5,479,637 A | 12/1995 | Lisimaque et al. ........... | 395/430 |
| 5,579,522 A | 11/1996 | Christeson et al. ........... | 395/652 |
| 5,596,738 A | 1/1997 | Pope .............................. | 395/430 |
| 5,598,534 A | 1/1997 | Haas ........................ | 395/200.09 |
| 5,608,910 A | 3/1997 | Shimakura .................... | 395/670 |
| 5,623,604 A | 4/1997 | Russell et al. ............. | 395/200.1 |
| 5,666,293 A | 9/1997 | Metz et al. ................. | 395/200.5 |
| 5,752,039 A | 5/1998 | Tanimura ..................... | 395/712 |
| 5,778,440 A | 7/1998 | Yiu et al. ..................... | 711/154 |
| 5,790,974 A | 8/1998 | Tognazzini .................... | 701/204 |
| 5,878,256 A | 3/1999 | Bealkowski et al. ......... | 395/652 |
| 5,960,445 A | 9/1999 | Tamori et al. ................. | 707/203 |
| 6,009,497 A | 12/1999 | Wells et al. ................... | 711/103 |
| 6,038,636 A | 3/2000 | Brown, III et al. ........... | 711/103 |
| 6,064,814 A | 5/2000 | Capriles et al. ............... | 395/701 |
| 6,073,206 A | 6/2000 | Piwonka et al. .............. | 711/102 |
| 6,073,214 A | 6/2000 | Fawcett ........................ | 711/133 |
| 6,088,759 A | 7/2000 | Hasbun et al. ................ | 711/103 |
| 6,105,063 A | 8/2000 | Hayes, Jr. ..................... | 709/223 |
| 6,112,024 A | 8/2000 | Almond et al. ............... | 395/703 |
| 6,112,197 A | 8/2000 | Chatterjee et al. ............. | 707/3 |
| 6,126,327 A | 10/2000 | Bi et al. ................... | 395/200.51 |
| 6,128,695 A | 10/2000 | Estakhri et al. ............... | 711/103 |
| 6,157,559 A | 12/2000 | Yoo ............................... | 365/52 |
| 6,163,274 A | 12/2000 | Lindgren ................. | 340/825.44 |
| 6,198,946 B1 | 3/2001 | Shin et al. ..................... | 455/561 |

(Continued)

FOREIGN PATENT DOCUMENTS

CA 2339923 3/2000

(Continued)

OTHER PUBLICATIONS

Euroloader, "Technical Specification" Dec. 2001, ECCA Euroloader Specificaion—pp. 1-60.*

(Continued)

*Primary Examiner* — Tuan Anh Vu

(57) ABSTRACT

An update system comprising a mobile handset with an update agent and an operating system, such as Symbian OS, that supports a file system, and a server, facilitates the download of update packages from the server and the subsequent update of firmware/software in the mobile handset. In an embodiment of the present invention, the update agent may be incorporated into the phases of the bootstrap process that an operating system, such as Symbian OS, may execute during startup.

20 Claims, 4 Drawing Sheets

U.S. PATENT DOCUMENTS

| | | | |
|---|---|---|---|
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 7,055,148 B2 * | 5/2006 | Marsh et al. | 717/172 |
| 7,644,404 B2 * | 1/2010 | Rao et al. | 717/169 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0095501 A1 | 7/2002 | Chiloyan et al. | |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0097431 A1 * | 5/2003 | Dill | 709/221 |
| 2004/0083469 A1 | 4/2004 | Chen et al. | |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

Symbian: "Symbian OS powered Sony Ericsson P800 Smartphone to ship in Q3 2003" Mar. 2002 pp. 1-2.*

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

MOBILE HANDSET WITH SYMBIAN OS AND UPDATE AGENT

RELATED APPLICATIONS

This patent application makes reference to, claims priority to and claims benefit from U.S. Provisional Patent Application Ser. No. 60/479,265, entitled "Mobile Handset with Symbian OS and Update Agent," filed on Jun. 18, 2003.

The complete subject matter of the above-referenced United States Provisional Patent Application is hereby incorporated herein by reference, in its entirety. In addition, this application makes reference to U.S. patent application Ser. No. 10/770,983, entitled "Update System for Facilitating Firmware/Software Update in a Mobile Handset," filed Feb. 3, 2004 which is now abandoned, U.S. Provisional Patent Application Ser. No. 60/249,606, entitled "System and Method for Updating and Distributing Information," filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Problems may arise when supporting firmware updates in devices that contain file systems. For example, the location of information stored in such a file system often needs to be communicated to low level drivers or firmware components that need to access such information before any operating system services such as, for example, file systems, are available. There may also be a need to communicate status information to low-level drivers or firmware components before the operating system services that support such communication are available, for example, during power up or reboot.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system that updates firmware in an electronic device such as, for example, a portable device with a file system, using updating information received from a server via a communication network, which may be wireless. The system may comprise an operating system such as, for example, a Symbian operating system that supports a file system, and updating software that applies the updating information to the firmware. The operating system may facilitate downloading of updating information from the server. The updating software may be incorporated into a process associated with the operating system, and the process may be executed prior to the start of the operating system. In an embodiment of the present invention, the server may be external to the electronic device.

In an embodiment of the present invention, the updating software may be invoked at the end of a second phase immediately after a stack is initialized in a first phase. In yet another embodiment of the present invention, the updating software may be a substitute to a standard sequence.

In an embodiment of the present invention, the process may comprise a bootstrap process executed by the operating system during start up of the electronic device. The system may comprise a boot block, wherein the bootstrap process may be executed in the boot block. The location of the updating software may be determined by the amount of free space in the boot block.

In an embodiment of the present invention, the updating software may be incorporated into one of a plurality of phases associated with the bootstrap process. In another embodiment of the present invention, the updating software may be part of the bootstrap process.

In an embodiment of the present invention, the bootstrap process may comprise a boot loader that directs a booting sequence into a plurality of paths. In one embodiment, the updating software may be one of the plurality of paths. In another embodiment, the bootstrap process may comprise a boot loader having the updating software and an operating system bootstrap.

In an embodiment of the present invention, the electronic device may comprise memory, a memory management unit, peripheral hardware, firmware, a processor, an operating system, and a bootstrap sequence. The bootstrap sequence may comprise an initial phase that initializes the processor and the peripheral hardware, a second phase that completes initialization of stack and memory layout of the electronic device, an updating software entry point at the end of the second phase, and a third phase that completes a boot sequence, initializes the memory management unit, and transfers execution to a portion of the operating system.

The electronic device may comprise memory, a memory management unit, peripheral hardware, firmware, a processor, and operating system and a bootstrap sequence. The bootstrap sequence may comprise an initial phase that initializes the processor and the peripheral hardware; a second phase that completes initialization of stack and memory layout of the electronic device; an updating software entry point at the end of the second phase; and a third phase that completes a boot sequence, initializes the memory management unit, and transfers execution to a portion of the operating system.

In an embodiment of the present invention, the updating software may be invoked using an instruction from the second phase that causes the code to branch and link to the updating software. The bootstrap sequence may be incorporated into a boot loader of the processor.

Aspects of the present invention may be seen in a machine-readable storage having stored thereon, a computer program having at least one code section that updates firmware in an electronic device with a file system, using updating information received from a server via a communication network. The at least one code section may be executable by a machine for causing the machine to perform steps that comprise facilitating downloading of updating information from the server, and applying the updating information to the firmware; wherein the applying of the updating information is incorporated into a process associated with the operating system. The process may be a bootstrap sequence.

In an embodiment of the present invention, the electronic device may comprise memory, a memory management unit, peripheral hardware, firmware, a processor, and an operating system.

In an embodiment of the present invention, the machine-readable storage may further comprise code for initializing the processor and the peripheral hardware at a first phase, code for completing initialization of stack and memory layout of the electronic device at a second phase, an updating software entry point at the end of the second phase, and code for completing a boot sequence, initializing the memory management unit, and transferring execution to a kernel at a third phase. The machine-readable storage may further comprise code comprising an instruction from that second phase that causes the code to branch and link to the updating software to invoke the updating software.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to generating updates of firmware/software components in electronic devices such as, for example, mobile handsets using an update agent, and specifically to the update of firmware/software from one version to another in mobile handsets and other constrained devices, especially those with file systems. Although the following discusses aspects of the invention in terms of a mobile handset, it should be clear that the following also applies to other mobile electronic devices such as, for example, personal digital assistants (PDAs), pagers, personal computers (PCs), and similar handheld electronic devices.

Figure 1:
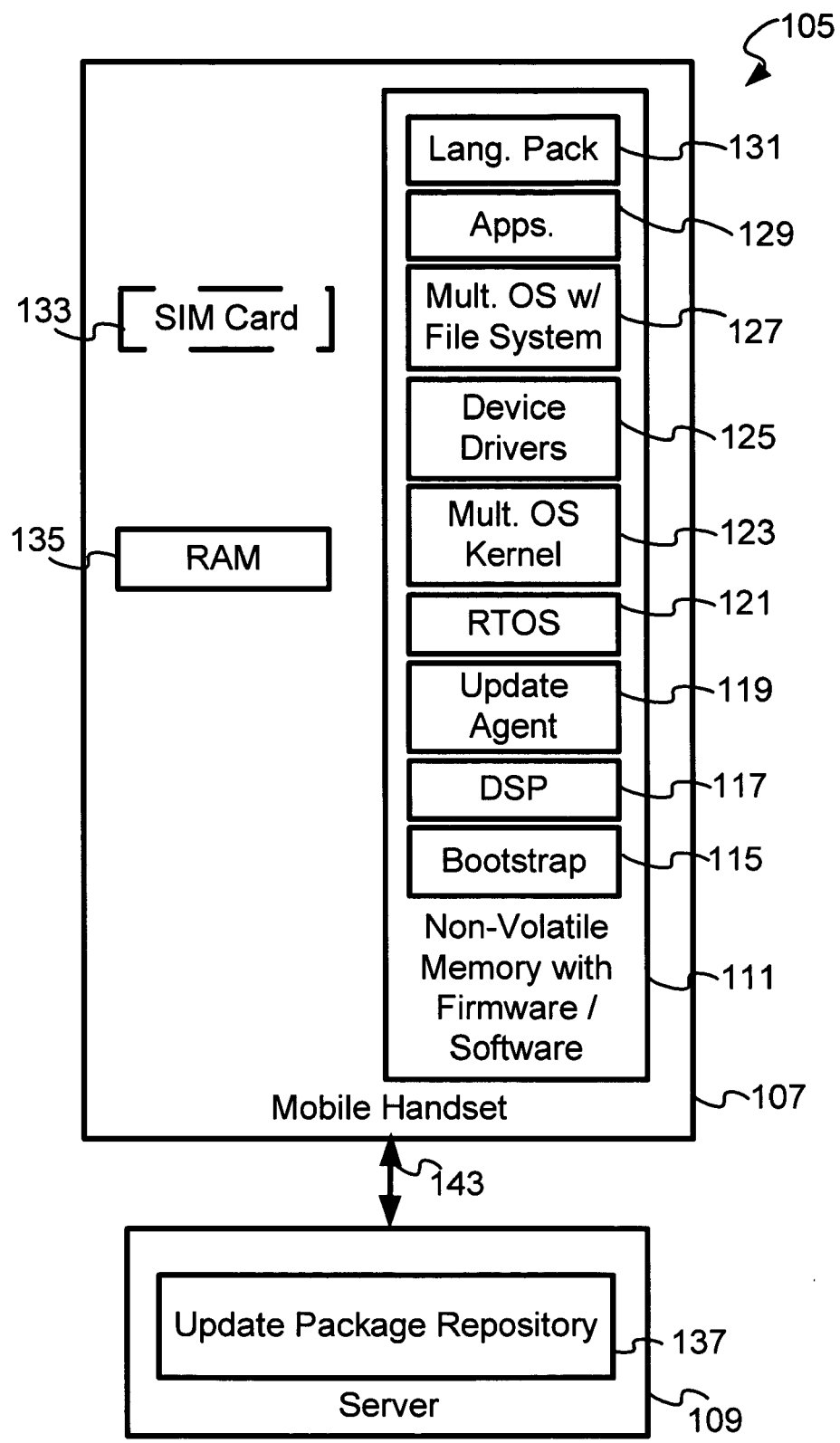
FIG. 1 illustrates a block diagram of an exemplary update system for facilitating firmware/software updates in a mobile handset, in accordance with an embodiment of the present invention.

FIG. 1 illustrates a block diagram of an exemplary update system 105 for facilitating firmware/software updates in a mobile handset 107, in accordance with an embodiment of the present invention. The update system 105 may comprise a mobile handset 107, with a file system such as, for example, a Symbian operating system (OS). The mobile handset 107 may be connected to a server 109 via a communication link 143. In an embodiment of the present invention, the server 109 may host an update package repository 137, which may contain update packages for firmware/software in electronic devices such as, for example, mobile handset 107 connected to the server 109. In an embodiment of the present invention, an update package may contain executable instructions used to convert firmware/software in the mobile handset 107 from one version to another.

In an embodiment of the present invention, the mobile handset 107 may comprise a non-volatile memory 111 with firmware/software, and a random access memory (RAM) 135. In an embodiment of the present invention, the mobile handset 107 may also comprise a subscriber identity module (SIM) card 133. In an embodiment of the present invention, the non-volatile memory 111 may comprise firmware/software such as, for example, bootstrap loader 115, digital signal processing (DSP) code 117, an update agent 119, a real-time operating system (RTOS) 121, a multiprocessing operating system kernel 123, device drivers modules 125, a multiprocessing operating system with file system 127, an applications layer 129, and a language pack 131.

In an embodiment of the present invention, the mobile handset 107 may facilitate retrieval of update packages from an external system such as, for example, the update package repository 137 in the server 109. In another embodiment of the present invention, the mobile handset 107 may retrieve update packages from a local file system in the mobile handset 107 such as, for example, the multiprocessing operating system with file system 127. The mobile handset 107 may then employ the update agent 119 to apply the retrieved update packages to the firmware/software in the mobile handset 107.

In an embodiment of the present invention, the update agent 119 may retrieve an update package employing update package-related information. The update package-related information may be stored in an update package reference (not shown). The update package-related information may comprise information such as, for example, an update package location address, a working bank address, verification information, and a status flag. The update agent 119 may retrieve update package-related information from an update package reference, which may be stored in the non-volatile memory 111. The update package reference may be populated into the non-volatile memory 111 by an update driver that is part of the device drivers 125, responsible for saving an update package. In another embodiment of the present invention, the update package reference may be populated into the non-volatile memory 111 by software capable of downloading an update package and saving information related to the downloaded update package. In another embodiment of the present invention, the update package reference may be found in the SIM card 133.

In an embodiment of the present invention, the update agent 119 may be incorporated into the bootstrap loader 115. In another embodiment of the present invention, the update agent 119 may be incorporated into the RTOS 121.

In an embodiment of the present invention, the multiprocessing operating system with file system 127 may be a Symbian OS by Symbian, Ltd. The multiprocessing operating system 127 may have its own bootstrap process as part of the OS kernel 123, into which the update agent 119 may be incorporated.

In an embodiment of the present invention, an update agent 119 may be incorporated into the phases of the bootstrap loader 115 that an operating system, such as Symbian OS, may execute during startup. Integrating a firmware update process with the Symbian OS may provide a mechanism to update firmware in mobile handsets with Symbian OS such as, for example, mobile handset 107.

Figure 2:
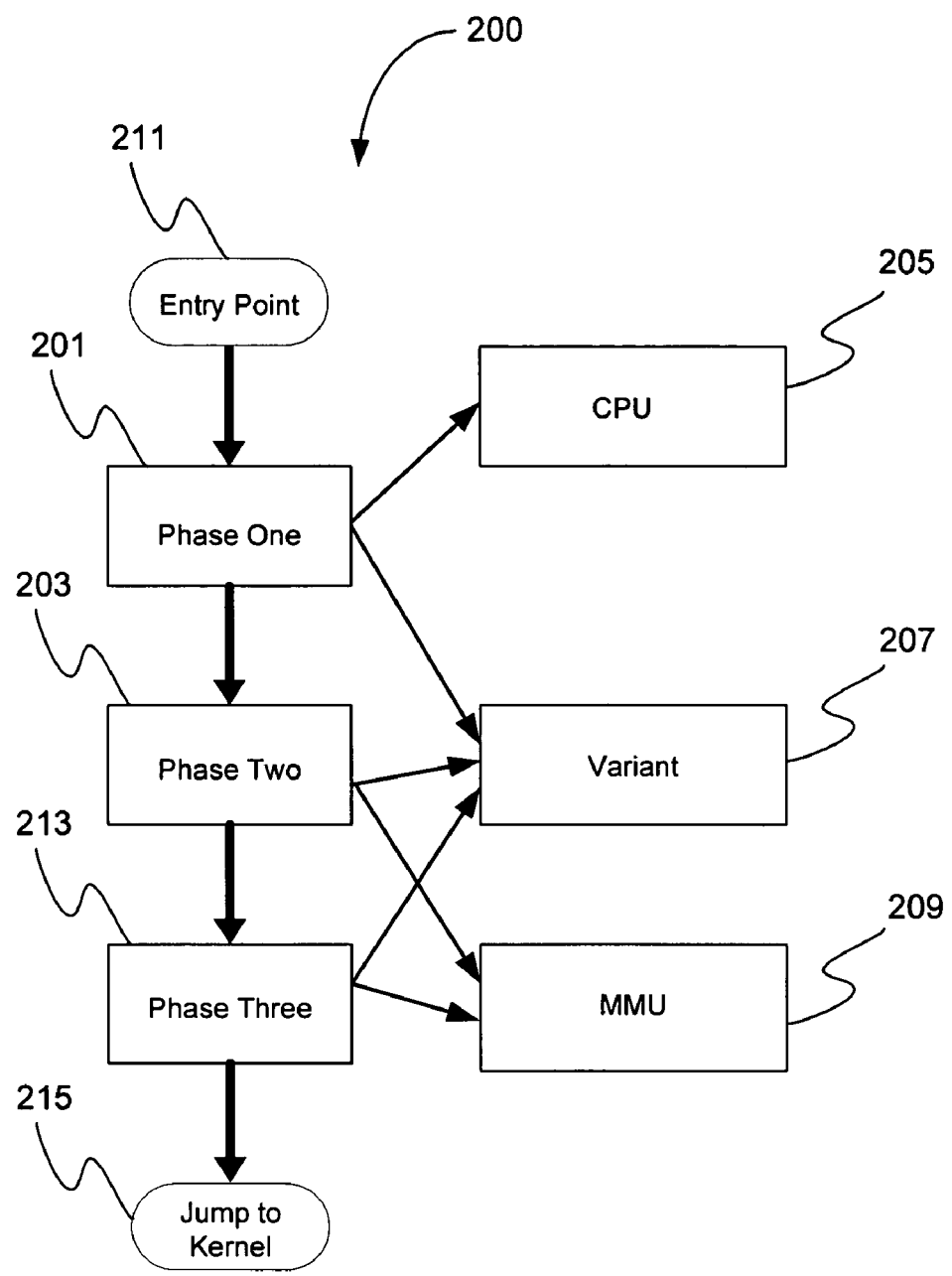
FIG. 2 illustrates a block diagram of an exemplary layout of a Symbian bootstrap, in accordance with an embodiment of the present invention.

FIG. 2 illustrates a block diagram of an exemplary layout of a Symbian bootstrap sequence 200, in accordance with an embodiment of the present invention. The Symbian bootstrap sequence 200 may comprise several modules, where each module may represent a phase in the overall process. The initial phase 201 may be responsible for initializing the CPU 205 and variants 207 such as, for example, peripheral hardware including RAM, initialization of input/output ports for debug purposes, initialization of the stack in memory, and the memory layout of the electronic device. The second phase 203 of the bootstrap may complete the initialization of stack and memory layout of the mobile handset 107. During the third phase 213 the boot sequence may be completed, the memory management unit (MMU) 209 may be initialized, and execution may be transferred to the kernel 215.

An update agent such as, for example, the update agent 119 of FIG. 1 may be self-contained software that may be capable of updating firmware/software in a fault-tolerant fashion. The update agent may be part of the bootstrap, or may be an alternate path to the standard boot sequence.

In an embodiment of the present invention, the entry point for the update agent may be at the end of the second phase immediately after the stack is initialized. The actual memory location of the update agent executable code may be within the image of the firmware on which an update is performed. The location of the update agent may be determined by two factors: one being the amount of space available in the boot block, and another being the flexibility of including the update agent in the firmware image. The boot block is an area in flash memory the lowest address of which may be the first location jumped after initialization. This jump may occur at device start up or power up.

Figure 3:
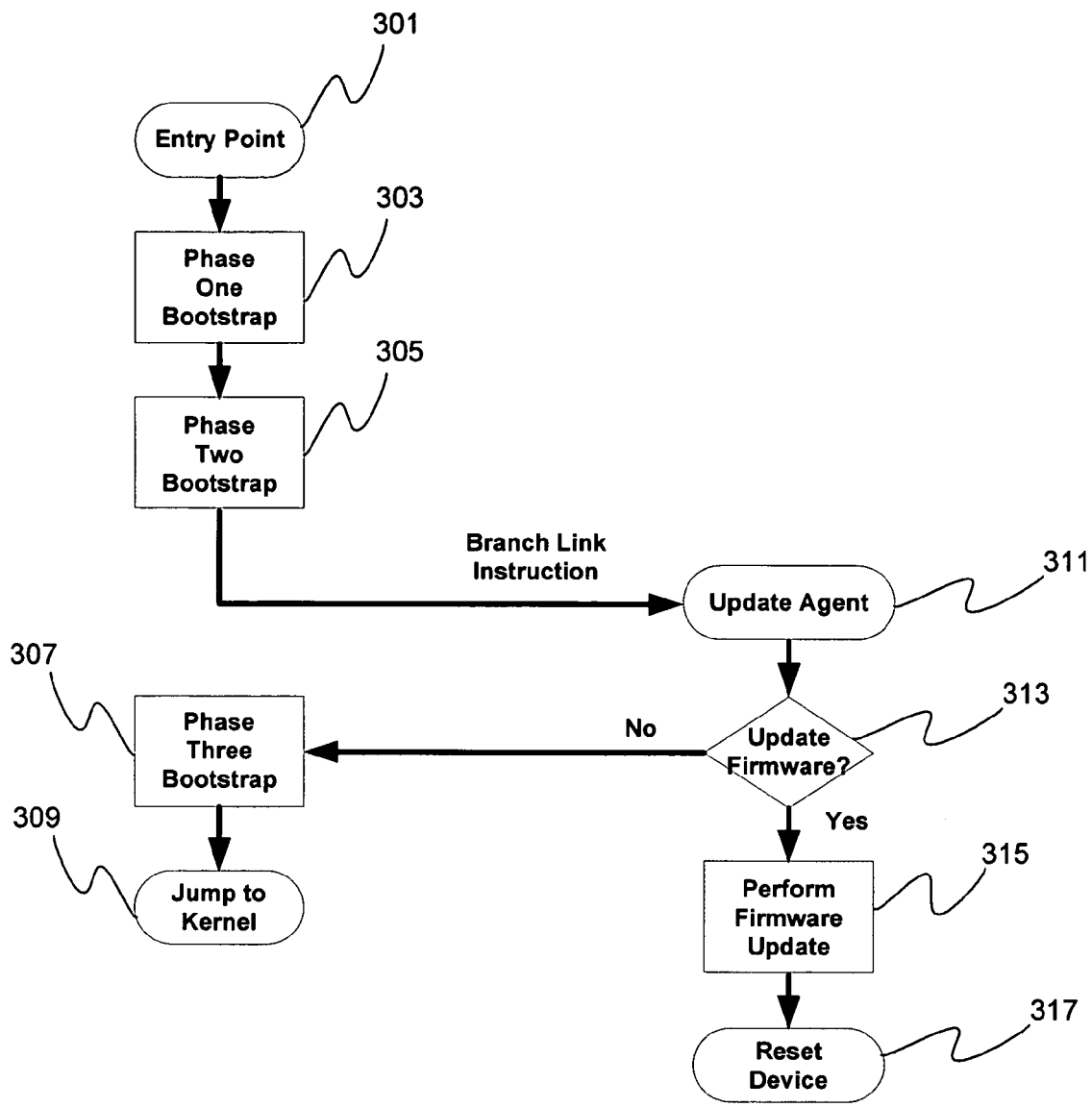
FIG. 3 illustrates an exemplary flow diagram of integration of an update agent into a Symbian bootstrap, in accordance with an embodiment of the present invention.

FIG. 3 illustrates an exemplary flow diagram of integration of an update agent into a Symbian bootstrap, in accordance with an embodiment of the present invention. Following the entry point 301, phase one of the bootstrap may be executed at 303. Phase two of the bootstrap may then be executed at 305, after which a branch occurs to the update agent at 311. The jump to the update agent may be an instruction that may allow the update agent to return to the normal boot sequence if needed. A check as to whether an update is needed for firmware may be done at 313. If no update is needed, phase three of the bootstrap may be executed at 307, and a jump to the OS kernel may occur at 309. If, however, at 313 it is determined that an update is available, the firmware may be updated at 315, after which the device may be reset at 317.

In another embodiment of the present invention, the update agent integration into a device may be within a boot loader. The boot loader may be thought of as staging software that directs the booting sequence into multiple paths, one of which may be the update agent.

Figure 4:
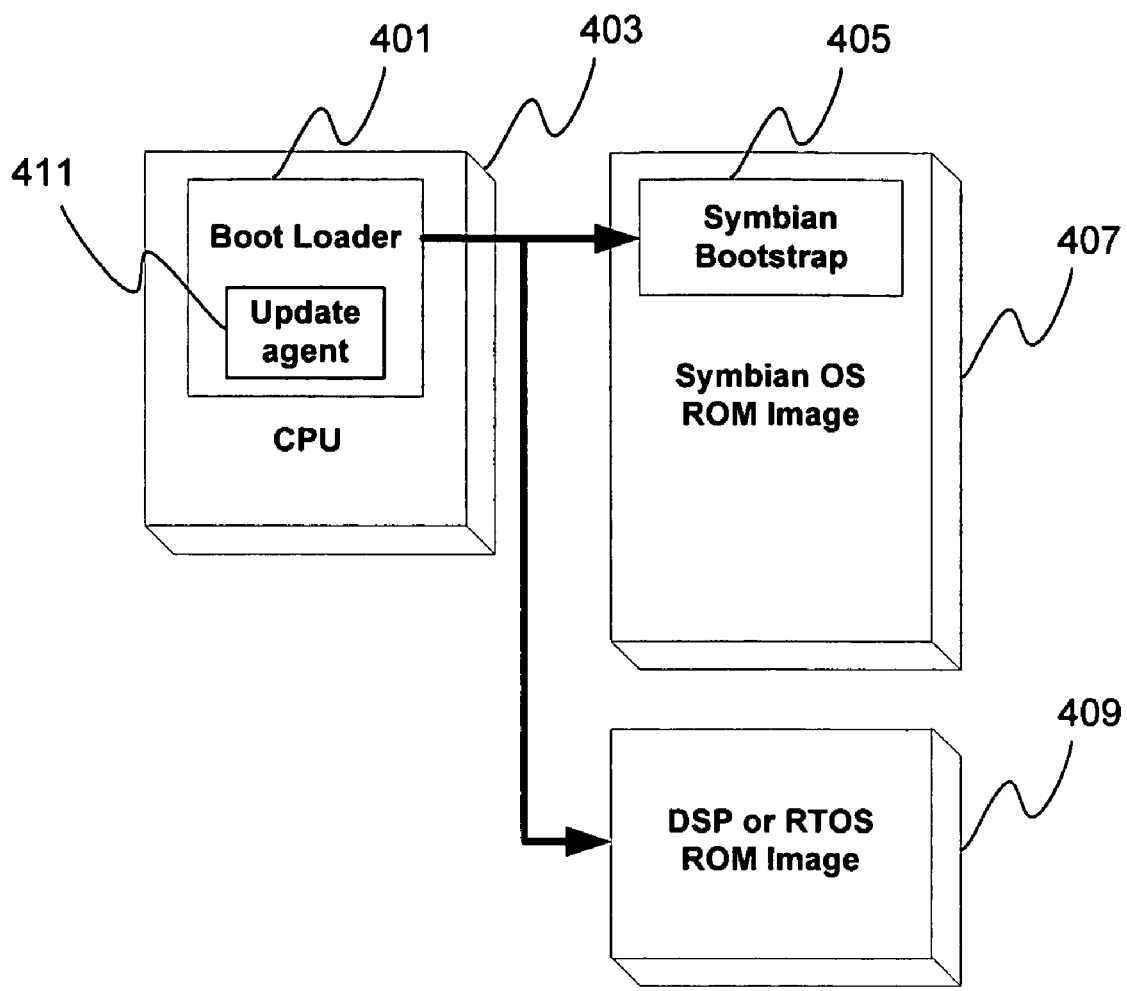
FIG. 4 illustrates a block diagram of an exemplary integration of an update agent into a boot loader, in accordance with an embodiment of the present invention.

FIG. 4 illustrates a block diagram of an exemplary integration of an update agent 411 into a boot loader 401, in accordance with an embodiment of the present invention. In an embodiment of the present invention, the boot loader 401 may reside in the internal non-volatile memory of the CPU 403. As a result, the underlying software code may be available for execution immediately after device power-up and before external peripherals are initialized.

In an embodiment of the present invention, the updated agent 411 may be placed in the boot loader 401 and as a result the scope of the update to multiple software systems stored in multiple peripheral storage devices may be expanded.

The boot loader 401 may invoke the update agent 411 or the Symbian bootstrap 405. In an embodiment of the present invention, the Symbian bootstrap 405 may reside in the flash memory in a section 407 that may be controlled by the Symbian OS. Additionally, the boot loader 401 may invoke the code 409 on top of which the Symbian OS may execute. The code 407 may be DSP code or real time OS.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system that updates firmware in an electronic device with a file system, using updating information received from a server via a communication network, the system comprising:

an operating system running on the electronic device that supports a file system, the operating system facilitating downloading of updating information from the server; and updating software that applies the updating information to the firmware; wherein the updating software is incorporated into a process associated with the operating system and the process comprises a bootstrap process executed by the operating system during start up of the electronic device, wherein the bootstrap process comprises:

an initial phase that initializes a processor and peripheral hardware of the electronic device;

a second phase that completes initialization of stack and memory layout of the electronic device;

an updating software entry point at the end of the second phase to perform the updating of the software; and a third phase that completes the bootstrap process, initializes a memory management unit, and transfers execution to a portion of the operating system.

2. The system according to claim 1 further comprising a boot block, wherein the bootstrap process is executed in the boot block.

3. The system according to claim 2 wherein the location of the updating software is determined by the amount of free space in the boot block.

4. The system according to claim 1 wherein the updating software is incorporated into one of the plurality of phases associated with the bootstrap process.

5. The system according to claim 1 wherein the operating system comprises a Symbian operating system.

6. The system according to claim 1 wherein the electronic device is portable.

7. The system according to claim 1 wherein the communication network is wireless.

8. The system according to claim 1 wherein the server is external to the electronic device.

9. The system according to claim 1 wherein the updating software at the end of the second phase is performed immediately after a stack is initialized in a first phase.

10. The system according to claim 1 wherein the updating software is a substitute to a standard boot sequence.

11. The system according to claim 1 wherein the bootstrap process comprises a boot loader that directs a booting sequence into a plurality of paths.

12. The system according to claim 11 wherein the updating software is one of the plurality of paths.

13. The system according to claim 11 wherein the bootstrap process comprises a boot loader having the updating software and an operating system bootstrap.

14. An electronic device comprising: memory, a memory management unit, peripheral hardware, firmware, a processor, an operating system that supports a file system and the operating system facilitates receiving updating information, and updating software that applies the updating information to the firmware and the updating software is incorporated into a process associated with the operating system, and the process comprises a bootstrap sequence, the bootstrap sequence comprising:
an initial phase that initializes the processor and the peripheral hardware;
a second phase that completes initialization of stack and memory layout of the electronic device;
an updating software entry point at the end of the second phase; and
a third phase that completes a boot sequence, initializes the memory management unit, and transfers execution to a portion of the operating system.

15. The electronic device of claim 14 wherein the updating software is invoked using an instruction from the second phase that causes the code to branch and link to the updating software.

16. The electronic device of claim 14 wherein the bootstrap sequence is incorporated into a boot loader of the processor.

17. The electronic device of claim 14 wherein the electronic device is portable.

18. A machine-readable storage having stored thereon, a computer program having at least one code section that updates firmware in an electronic device with a file system, using updating information received from a server via a communication network, the at least one code section being executable by a machine for causing the machine to perform a bootstrap sequence, wherein the code section that updates the firmware performs a process associated with an operating system of the electronic device and the process comprises the bootstrap sequence, and the bootstrap sequence comprises:

facilitating downloading of updating information from the server; and
applying the updating information to the firmware by performing an initial phase that initializes a processor and peripheral hardware of the electronic device; performing initialization of stack and memory layout of the electronic device at a second phase; applying the updating information at an updating software entry point at the end of the second phase; and completing a boot sequence, initializing a memory management unit, and transferring execution to a kernel at a third phase.

19. The machine-readable storage according to claim 18 wherein the electronic device comprises memory, a memory management unit, peripheral hardware, firmware, and a processor.

20. The machine-readable storage according to claim 18 further comprising code comprising an instruction from the second phase that causes the code
to branch and link to the updating software to invoke the updating software.

* * * * *